United States Patent [19]

Kan et al.

[11] Patent Number: 5,088,537
[45] Date of Patent: Feb. 18, 1992

[54] RADIAL TIRE WITH A SIDEWALL HAVING A THREE-LAYER STRUCTURE

[75] Inventors: Masanori Kan; Keijiro Oda, both of Hyogo, Japan

[73] Assignee: Toyo Tire & Rubber Co., Ltd., Osaka, Japan

[21] Appl. No.: 357,576

[22] Filed: May 25, 1989

[30] Foreign Application Priority Data

Oct. 7, 1988 [JP] Japan ................... 63-254623

[51] Int. Cl.$^5$ .................. B60C 13/00; B60C 1/00; C08L 45/00
[52] U.S. Cl. .................. 152/525; 152/555; 525/211; 525/237
[58] Field of Search ............... 152/525, DIG. 12, 555, 152/560, 524; 525/211, 237

[56] References Cited

U.S. PATENT DOCUMENTS

| | | | |
|---|---|---|---|
| 3,653,423 | 4/1972 | Paddock | 152/525 X |
| 3,830,274 | 8/1974 | Waser, Jr. | 152/525 X |
| 3,937,862 | 2/1976 | Dillenschneider | 152/525 X |
| 4,004,627 | 1/1977 | Sandstrom et al. | 152/DIG. 12 |
| 4,224,196 | 9/1980 | Gursky . | |
| 4,645,793 | 2/1987 | Von Hellens et al. | 152/525 X |
| 4,804,028 | 2/1989 | Botzman | 152/DIG. 12 X |

FOREIGN PATENT DOCUMENTS

59-14502 1/1984 Japan .
62-143955 6/1987 Japan .

Primary Examiner—Michael W. Ball
Assistant Examiner—Gregory J. Wilber
Attorney, Agent, or Firm—Jordan and Hamburg

[57] ABSTRACT

The invention relates to a radial tire in which each sidewall covering and protecting the side face of the carcass is composed of a plurality of layers differing in rubber composition. In the radial tire according to the invention, the sidewall has a three-layer structure consisting of an adjesive layer adjacent to the carcass, an inner layer disposed outwardly thereon and an outer layer disposed further outwardly thereon. The rubber components in the rubber compositions respectively constituting the three layers differ in proportions of the rubber having as low degree of unsaturation and the rubber having a high degree of unsaturation and the high-unsaturation rubber content decreases in the order of adhesive layer, inner layer and out layer. While retaining the endurance characteristics and ozone resistance of the conventional tires, the radial tire according to the invention is improved in that its good appearance can be prevented from being spoiled by staining or discoloration of its side portions. In spite of the use of rubbers having a low degree of unsaturation, the invention provides a radial tire having sidewalls excellent in adhesiveness to the carcass and other portions made of a diene rubber composition.

4 Claims, 1 Drawing Sheet

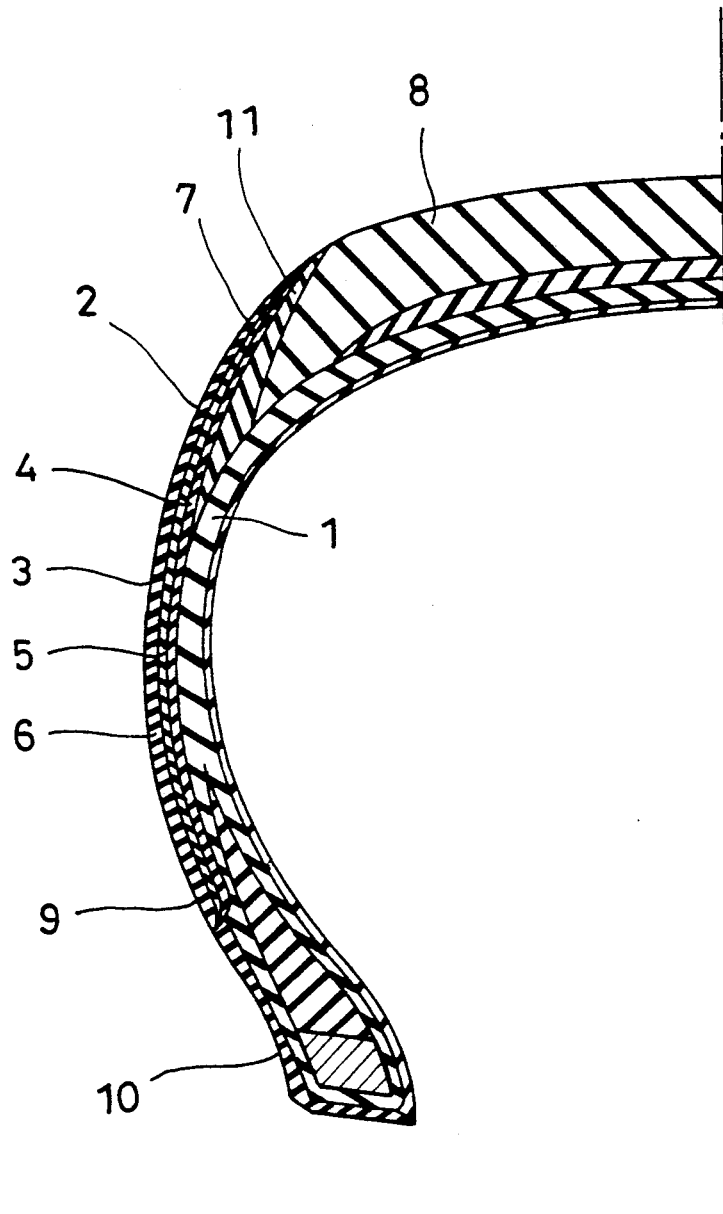

RADIAL TIRE WITH A SIDEWALL HAVING A THREE-LAYER STRUCTURE

BACKGROUND OF THE INVENTION

This invention relates to a radial tire and, more particularly, to a radial tire in which each sidewall covering and protecting the side face of the carcass is composed of a plurality of layers differing in rubber composition.

Prior art pneumatic tires generally have sidewalls made of a rubber composition comprising a rubber having a high degree of unsaturation, the main chain of which has a high double bond content, such as natural rubber, polyisoprene, polybutadiene, or styrene-butadiene copolymer. Since the double bonds in the main chain of the molecule of such rubber are apt to react with ozone, leading to depolymerization, when the tire is exposed to intense ultraviolet rays or to a high concentration of ozone in air, cracking, namely the so-called ozone cracking, occurs.

In particular, radial tires with their carcass reinforced with belts made of a cord of high Young's modulus, such as a steel cord, at the top portion of the carcass are susceptible to ozone cracking since they have sites of discontinuity in rigidity from the tread portion to each side portion. Thus, when in contact with the ground and under loading, the tread portion is constrained by the high-rigidity belts and the resulting shear strain is small but the shear stress increases accordingly. On the other hand, in the side portions which are not constrained by rigidity, the shear stress decreases but, instead, the shear strain increases markedly. In such strained state, the development of ozone cracks on the rubber composition surface is accelerated in an exponential manner.

For preventing such cracking, an antiozonant, for example an amine type antioxidant or a wax, is generally incorporated in the rubber composition constituting the sidewalls.

However, radial tires the sidewalls of which are made of a rubber composition containing such an antiozonant are subject to blooming of the antiozonant on the sidewall surface during storage. Such blooming makes them look as if they are covered with dust. Furthermore, amine type antioxidants readily turn brown upon exposure to air and/or sunlight, so that the thin antiozonant layer formed on the sidewall surface as a result of blooming becomes brown. This masks the original black color of the tires and spoils their appearance, reducing their commercial value.

In addition, amine type antioxidants are carried away by rain water, among others, so that their content in sidewalls decreases. It is difficult to maintain their cracking-preventing effect stably.

Therefore, investigations were made to construct the sidewalls with a rubber composition containing an antiozonant, which may possibly cause blooming and staining of the sidewalls, in a reduced amount by using a rubber having a low unsaturated bond content, or a low degree of unsaturation, and thus having stronger ozone resistance by itself (e.g. U.S. Pat. No. 4,224,196; Japanese Kokai Patent Publication No. 59-14502; Japanese Kokai Patent Publication No. 62-143955).

However, rubbers having a low degree of unsaturation are curable at a slower rate as compared with diene rubbers (rubbers having a high degree of unsaturation) generally used in carcass and tread formation. Therefore, even when the rate of curing of the former is adjusted so as to become comparable to the rate of curing of the latter by using a vulcanization accelerator, migration of the accelerator occurs at the interface between the former and the latter, so that the rate of curing becomes faster locally and the period over which both the rubber species can diffuse through each other becomes shortened. As a result, the adhesion between them becomes poor. Such problem cannot be solved even by the means proposed in Japanese Kokai Patent Publication No. 59-14502, which comprises constructing the sidewalls each as a double-layer structure having an inner layer and an outer layer using a rubber composition containing a large amount of a rubber having a low degree of unsaturation for the construction of the outer layer and a diene rubber for the construction of the inner layer. Radial tires in which a rubber having a low degree of unsaturation is used for the formation of the sidewall thus have never been put to practical use.

SUMMARY OF THE INVENTION

Accordingly, it is an object of the invention to solve the above problem and provide a radial tire having sidewalls showing good adhesion to the carcass and other portions constructed with a diene rubber composition while using rubbers having a low degree of unsaturation.

The radial tire according to the invention is a radial tire in which each sidewall covering and protecting the side face of the carcass is composed of a plurality of layers differing in rubber composition, which is characterized in that the sidewall has a three-layer structure consisting of an adhesive layer adjacent to the carcass, an inner layer disposed outwardly on said adhesive layer and an outer layer disposed outwardly on said inner layer, that the rubber component of the rubber composition constituting said adhesive layer consists essentially of 0 to 10% by weight of at least one rubber having a low degree of unsaturation selected from the group consisting of halogenated butyl rubber and ethylene-propylene-diene rubber and 100 to 90% by weight of at least one rubber having a high degree of unsaturation selected from the group consisting of natural rubber, polyisoprene, polybutadiene and styrene-butadiene copolymer, that the rubber component of the rubber composition constituting said inner layer consists essentially of 10 to 50% by weight of at least one rubber having a low degree of unsaturation selected from the corresponding group defined above and 90 to 50% by weight of at least one rubber having a high degree of unsaturation selected from the corresponding group defined above, that the rubber component of the rubber composition constituting said outer layer consists essentially of 30 to 70% by weight of at least one rubber having a low degree of unsaturation selected from the corresponding group defined above and 70 to 30% by weight of a rubber having a high degree of unsaturation selected from the corresponding group defined above and that the high-degree-of-unsaturation rubber content in the rubber component of the layer-constituting rubber composition decreases in the order of adhesive layer, inner layer and outer layer.

The rubber component of the rubber composition constituting the outer layer, which comes in direct contact with ozone, contains 30 to 70% by weight of a rubber or rubbers having a low degree of unsaturation and 70 to 30% by weight of a rubber or rubbers having a high degree of unsaturation and said rubber component itself is resistant to ozone. Therefore, the antioxidant and wax addition levels can be reduced so that spoilage of the appearance can be prevented. When the low-unsaturation rubber content exceeds 70% by weight, the rubber strength decreases and the sidewall surface may be scratched or otherwise get hurt readily. When said content is below 30% by weight, the ozone resistance decreases and therefore it becomes necessary to increase the wax and antioxidant addition levels.

The high-unsaturation rubber contents in the rubber components in the rubber compositions constituting the adhesive layer, inner layer and outer layer, respectively, show a gradual decrease in the order of adhesive layer, inner layer and outer layer. This measure is taken to reduce the high-unsaturation rubber content stepwise between the carcass and the sidewall outer layer, namely to reduce the difference in high-unsaturation rubber content between two neighboring layers, so that the possible difference in rate of vulcanization can be reduced, and at the same time to make the rubbers in two neighboring layers to resemble each other in chemical properties so that the adhesiveness can be improved.

If the high-unsaturation rubber content in the rubber component in the rubber composition constituting said inner layer is below 50% by weight, the adhesion to the adhesive layer will be unsatisfactory. If said content exceeds 90% by weight, the adhesion to the outer layer will be unsatisfactory. If the high-unsaturation rubber content of the adhesive layer is below 90% by weight, the adhesion to the carcass will be poor.

As mentioned above, the radial tire according to the invention retains the durability and ozone resistance and at the same time is prevented from the impairment of its appearance on the sides due to staining.

Furthermore, the present invention provides a radial tire having sidewalls with good adhesion to the carcass and other portions constructed with a diene rubber composition in spite of the use of a rubber having a low degree of unsaturation.

BRIEF DESCRIPTION OF THE DRAWING

FIG. 1 shows an embodiment of the invention in a meridian section of the half thereof.

DETAILED DESCRIPTION OF PREFERRED EMBODIMENTS

For maintaining good adhesion among sidewall-constituting layers in the practice of the invention, the high-unsaturation rubber contents in the rubber compositions constituting the respective layers should preferably be such that, for neighboring two layers, the high-unsaturation rubber content in the outside layer is not less than 40% of that in the inside layer. When the former content is less than 40% of the latter, the difference in high-unsaturation rubber content between the two neighboring layers becomes too great and the adhesiveness may possibly become unsatisfactory.

The antioxidant and wax addition levels in the rubber composition constituting the inner layer should preferably be higher than those in the rubber composition constituting the outer layer. Since the extent of migration of antioxidants and waxes is small in rubbers having a low degree of unsaturation, blooming on the outer layer surface is reduced and the beautiful appearance can be maintained while, at the same time, blooming still takes place to a small extent, whereby the ozone cracking-preventing effect can be secured.

For tires having the so-called SWOT structure in which the inside face of the upper end portion of each sidewall is in close connection with each side face of the tread rubber, it is preferable that the upper end portion of the sidewall should also have such a three-layer structure since, in that case, the tread made of a rubber or rubbers having a high degree of unsaturation comes adjacent to the adhesive layer rich in a rubber or rubbers having a high degree of unsaturation.

On the other hand, for tires having the so-called TOS structure in which each peripheral inside face of the tread rubber is adhered to the outside face of the upper end portion of each sidewall, it is advisable that the upper end portion of each sidewall, which is to be adhered to the inside face of the tread, should have no outer layer portion and the inner layer should be adhered directly to the tread.

As the halogenated butyl rubber, which is one of the low-unsaturation rubbers to be used, there may be mentioned brominated butyl rubber and chlorinated butyl rubber in particular. The use of brominated butyl rubber, among others, results in improved adhesion to rubbers having a high degree of unsaturation, hence is preferred.

The invention is now described with reference to some examples of the rubber composition.

Rubber compositions containing at least one rubber having a low degree of unsaturation in lieu of a part of a rubber or rubbers having a high degree of unsaturation were prepared according to the formulations (in parts by weight) shown below in Table 1 for the purpose of confirming the improvement in ozone resistance of and the good adhesion between said rubber compositions. The results of the ozone resistance and staining or discoloration tests are shown in Table 1. Various rubber composition combinations were tested for adhesive strength and the results obtained are shown in Table 2.

The physical characteristics mentioned above were evaluated as follows:

a. Ozone cracking test (for evaluating dynamic ozone resistance and staining)

Test specimens, 10 mm in width, 2 mm in thickness and 40 mm in mark-to-mark distance, were prepared from each rubber composition. The specimens were subjected to accelerated aging at 90° C. for 48 hours and then subjected to repeated stretching at a percent stretch $[(\Delta l/l) \times 100]$ of 25% at a frequency of 60 times per minute in an atmosphere containing 50 pphm of ozone and maintained at 40° C., and the time required for 50% of the test specimens to have been broken was determined.

The test specimens were continuedly maintained in the ozone atmosphere under the same test conditions even after breakage thereof and, after 24 hours of ozone exposure, they were evaluated for staining. The criteria for staining evaluation were as follows: distinct staining—remarkable; slight staining—slight; no change in color—no change.

b. Adhesion test (for evaluating rubber-to-rubber adhesion)

An organic textile-backed rubber sheet was laid on top of another so that rubber-rubber peeling could be realized. The assembly was cured at 160° C. for 20 minutes and cut to strips having a width of 2.5 cm, and the strips were tested for rubber-to-rubber adhesive strength.

TABLE 1

| Rubber composition | carcass | A | B | C | D | E | F |
| --- | --- | --- | --- | --- | --- | --- | --- |
| Natural rubber | 80 | 60 | 30 | 30 | 20 | 30 | 20 |
| Butadiene rubber | — | 20 | 60 | 40 | 30 | — | — |
| SBR 1500 | 20 | 20 | — | — | — | — | — |
| Brominated butyl rubber | — | — | 10 | 10 | 40 | 70 | 50 |
| EPDM | — | — | — | 20 | 10 | — | 30 |
| Zinc oxide | 3 | 3 | 3 | 3 | 5 | 5 | 5 |
| Stearic acid | 2 | 2 | 2 | 2 | 2 | 2 | 2 |
| Antioxidant SP*1 | 1 | — | — | — | — | — | — |
| Antioxidant 6C*2 | — | 5 | 5 | 1 | — | — | — |
| Wax | — | 2 | 2 | 2 | — | — | — |
| Carbon black | 40 | 50 | 50 | 50 | 50 | 50 | 50 |
| Aromatic oil | 5 | 10 | 10 | 10 | 10 | 10 | 10 |
| Accelerator DM*3 | — | — | — | — | 0.9 | 1.1 | 1.1 |
| Accelerator CZ*4 | 1 | 0.8 | 0.8 | 1 | — | — | — |
| Vultac*5 | — | — | — | — | 1.1 | 1.1 | 1.1 |
| Sulfur | 2 | 1.8 | 1.8 | 1.8 | 0.6 | 0.6 | 0.6 |
| Ozone resistance (hours) | — | 12 | 18 | 16 | 20 | 16 | 24 |
| Staining | — | Remarkable | Remarkable | Slight | No change | No change | No change |

*1Antioxidant SP: Styrenated phenol
*2Antioxidant 6C: N-(1,3-Dimethylbutyl)-N'-phenyl-p-phenylenediamine
*3Accelerator DM: Dibenzothiazyl disulfide
*4Accelerator CZ: N-Cyclohexyl-2-benzothiazylsulfenamide
*5Vultac: Alkylphenol disulfide (Pennsalt Chem.)

TABLE 2

| | Rubber composition (kg/cm width) | | | | | |
| --- | --- | --- | --- | --- | --- | --- |
| Rubber composition | A | B | C | D | E | F |
| carcass | ST | ST | 12 | 8 | — | — |
| A | — | ST | 16 | 8 | 4 | 2 |
| B | — | — | ST | 16 | 14 | 4 | 2 |
| C | — | — | — | ST | 16 | 10 | 7 |
| D | — | — | — | — | ST | 14 | 8 |

ST: Specimens were torn and measurement failed.

As can be seen from the data shown in Table 1, the rubber compositions C to F in which the content of a rubber or rubbers having a low degree of unsaturation in the rubber component is not less than 30% by weight are superior in ozone resistance to the conventional rubber composition exclusively composed of rubbers having a high degree of unsaturation. Furthermore, the compositions C to F show only slight staining or no staining.

However, as indicated by the data in Table 2, the rubber compositions E or F are relatively less adhesive to the rubber compositions A and B. Even when layers made of such rubber compositions E to F are caused to adhere to layers made of the rubber composition A or B, the possibility of separation during use is thus high.

When, however, the rubber compositions of the two layers to be adhered to each other each contains an adequate amount of at least one rubber having a low degree of unsaturation (in other words, when each composition contains at least one rubber having a high degree of unsaturation in an appropriate amount), for example when, for the two neighboring layers to be adhered together, the high-unsaturation rubber content in the outside layer is adjusted to not less than 40% of that in the inside layer, an adhesive strength of not less than 8 kg/cm width (a standard value for the adhesive strength to be acceptable from the practical viewpoint) can be attained, as shown in Table 2.

The combinations shown below may be mentioned as preferred examples of the adhesive layer-inner layer-outer layer rubber composition combination for constructing three-layer sidewalls using the rubber compositions A to E. (The rubber composition F, which has an excessively high low-unsaturation rubber content, has a low rubber strength and readily gets damaged, hence is not suited for practical use.)

| | |
| --- | --- |
| (1) A - B - C | (2) A - B - D |
| (3) A - C - D | (4) A - C - E |
| (5) A - D - E | (6) B - C - D |
| (7) B - C - E | (8) B - D - E |

Now, referring to the drawing, one example of the radial tire according to the invention is described.

FIG. 1 schematically shows the structure of the so-called SWOT type tire. In the figure, the carcass (1) has a radial structure. A sidewall (2) is disposed on each side of carcass (1) in close connection therewith. The main portion (3) of sidewall (2) has a uniform thickness except for the letters and/or marks in relief. Said sidewall (2) has a three-layer structure consisting of an adhesive layer (4) adjacent to carcass (1), an inner layer (5) disposed outwardly thereon and an outer layer (6) disposed further outwardly thereon. The upper end portion (7) of sidewall (2) is disposed on the side of the tread rubber (8) and is gradually tapering in thickness toward the upper end. The lower end portion (9) of the sidewall is tapering in thickness toward the lower end and is followed by the rim strip (10). The adhesive layer (4) each of main portion (3), upper end portion (7) and lower end portion (9) consists essentially of a rubber composition containing, as the rubber component thereof, 0 to 10% by weight of at least one rubber having a low degree of unsaturation and 100 to 90% by weight of at least one rubber having a high degree of unsaturation. The inner layer (5) of main portion (3), upper end portion (7) and lower end portion (9) consists essentially of a rubber composition containing, as the rubber component thereof, 10 to 50% by weight of at least one rubber having a low degree of unsaturation and 90 to 50% by weight of at least one rubber having a high degree of unsaturation. The outer layer (6) of main portion (3), upper end portion (7) and lower end portion (9) consists essentially of a rubber composition containing, as the rubber component thereof, 30 to 70% by weight of at least one rubber having a low degree of unsaturation and 70 to 30% by weight of at least one rubber having a high degree of unsaturation.

Since, as mentioned above, the adhesive layer (4) of the sidewall is in contact with tread rubber (8), carcass (1) and rim strip (10), the content of the rubber or rubbers having a low degree of unsaturation in the rubber component for said adhesive layer should be not more than 10% by weight.

The tread rubber (8) is made of a rubber composition containing at least one rubber having a high degree of unsaturation as in the prior art. Since, however, it is reinforced with hard carbon black, which has good reinforcing effect, and accordingly has poor adhesiveness, it is preferable to dispose a tread side rubber (11), which is made of a rubber composition similar to the rubber composition of adhesive layer (4), on the side face of tread rubber (8) by the coextrusion technique by using a dual extruder and to thereby increase the adhesion to the sidewall.

For the purpose of demonstrating the utility of the radial tire according to the invention, sample tires for passenger cars were produced in which the rubber composition B defined above in Table 1 was used for constructing the adhesive layer (4) of sidewall (2), the rubber composition C defined in Table 1 for constituting the inner layer (5) and the rubber composition D for constituting the outer layer (6). For comparison, control tires of the conventional construction were produced in which the rubber composition A defined in Table 1 was used to construct single-layer sidewalls.

These tires were allowed to stand under the eaves with a southern exposure in a condition protected from rainwater and exposed to sunlight for one month and then examined for sidewall staining. The tires according to the invention did not show any blooming, staining or cracks. On the contrary, the control tires showed the occurrence of blooming on the side surface although no cracks were observed. The area of blooming had a red brown color, spoiling the appearance of the tires to a remarkable extent. After exposure to sunlight, the tires were subjected to a drum test under the endurance test conditions described in the Federal Motor Vehicle Safety Standards FMVSS 109. The tires according to the invention as well as the control tires met the relevant requirements.

What is claimed is:

1. A radial tire in which each sidewall covering and protecting the side face of the carcass is composed of a plurality of layers differing in rubber composition, the sidewall having a three-layer structure consisting of an adhesive layer adjacent to the carcass, an inner layer disposed outwardly on said adhesive layer and an outer layer disposed outwardly on said inner layer, the rubber component of the rubber composition constituting said adhesive layer consisting essentially of 0 to 10% by weight of at least one rubber having a low degree of unsaturation selected from Group I consisting of halogenated butyl rubber and ethylene-propylene-diene rubber and 100 to 90% by weight of at least one rubber having a high degree of unsaturation selected from Group II consisting of natural rubber, polyisoprene, polybutadiene and styrene-butadiene copolymer, the rubber component of the rubber composition constituting said inner layer consisting essentially of 10 to 50% by weight of at least one rubber having a low degree of unsaturation selected from said Group I and 90 to 50% by weight of at least one rubber having a high degree of unsaturation selected from said Group II, the rubber component of the rubber composition constituting said outer layer consisting essentially of 30 to 70% by weight of at least one rubber having a low degree of unsaturation selected from said Group I and 70 to 30% by weight of a rubber having a high degree of unsaturation selected from said Group II and the high-degree-of-unsaturation rubber content in each rubber component of each layer-constituting rubber composition decreasing in the order of adhesive layer, inner layer and outer layer, the high-unsaturation rubber content in each rubber composition constituting said adhesive layer, inner layer and outer layer is such that, for neighboring two layers, the high-unsaturation rubber content in the outside layer is not less than 40% of that in the inside layer.

2. A radial tire as claimed in claim 1, in which each sidewall covering and protecting the side face of the carcass having a radial structure has a three-layer structure consisting of an adhesive layer adjacent to the carcass, an inner layer disposed outwardly on said adhesive layer and an outer layer disposed further outwardly on said inner layer, the upper end portion of said sidewall being disposed on the side face of the tread rubber and tapering in thickness toward the upper end, the lower end portion of said sidewall tapering in thickness toward the lower end and being followed by the rim strip, the rubber component of the rubber composition constituting the adhesive layer each of the upper end portion, main portion and lower end portion of said sidewall consisting essentially of 0 to 10% by weight of at least one rubber having a low degree of unsaturation selected from said Group I and 100 to 90% by weight of at least one rubber having a high degree of unsaturation selected from said Group II, the rubber component of the rubber composition constituting the inner layer each of the upper end portion, main portion and lower end portion of said sidewall consisting essentially of 10 to 50% by weight of at least one rubber having a low degree of unsaturation selected from said Group I and 90 to 50% by weight of at least one rubber having a high degree of unsaturation selected from said Group II, the rubber component of the rubber composition constituting the outer layer each of the upper end portion, main portion and lower end portion of said sidewall consisting essentially of 30 to 70% by weight of at least one rubber having a low degree of unsaturation selected from said Group I and 70 to 30% by weight of at least one rubber having a high degree of unsaturation selected from said Group II and the high-unsaturation rubber content in each rubber component of each rubber composition decreasing stepwise in the order of adhesive layer, inner layer and outer layer.

3. A radial tire as claimed in claim 1, wherein an antioxidant addition level in the rubber composition constituting the inner layer is higher than that of the outer layer.

4. A radial tire as claimed in claim 1, wherein said one rubber having a low degree of unsaturation in each rubber composition is either halogenated butyl rubber or a combination of halogenated butyl rubber and ethylene-propylene-diene rubber.

* * * * *